(12) United States Patent
Elliott et al.

(10) Patent No.: US 7,133,606 B1
(45) Date of Patent: Nov. 7, 2006

(54) PIPE HEATING ASSEMBLY WITH HINGEDLY ATTACHED LIGHT EMITTERS

(76) Inventors: Daniel F. Elliott, 989 Lampard Way, Galt, CA (US) 95632; Paul E. Agans, 25201 N. Eunice Rd., Acampo, CA (US) 95220

( * ) Notice: Subject to any disclaimer, the term of this patent is extended or adjusted under 35 U.S.C. 154(b) by 0 days.

(21) Appl. No.: 11/055,764

(22) Filed: Feb. 11, 2005

(51) Int. Cl.
*F26B 3/30* (2006.01)

(52) U.S. Cl. .................. 392/411; 219/535; 219/220

(58) Field of Classification Search ........ 392/411–418, 392/422; 219/535, 521, 385, 525, 524, 220, 219/405, 411; 156/158, 304.2, 272.2, 273.3, 156/275.1, 380.9, 381, 499; 138/33, 35; 250/504 R, 495.1; 34/202, 104, 266
See application file for complete search history.

(56) References Cited

U.S. PATENT DOCUMENTS

| | | | | |
|---|---|---|---|---|
| 1,444,561 A * | 2/1923 | Schraeder | .................. | 392/416 |
| 1,971,287 A * | 8/1934 | Waker | ......................... | 239/419 |
| 2,325,950 A * | 8/1943 | Greene et al. | ................. | 34/87 |
| 2,420,399 A * | 5/1947 | New | ............................. | 34/553 |
| 2,426,976 A * | 9/1947 | Taulman | ..................... | 219/525 |
| 2,680,304 A * | 6/1954 | Herbert, Jr. | ..................... | 34/87 |
| 2,767,297 A * | 10/1956 | Benson | ....................... | 219/411 |
| RE24,296 E * | 3/1957 | Stewart | ....................... | 219/410 |
| 3,353,005 A * | 11/1967 | Burnham et al. | ............ | 219/411 |
| 3,403,243 A * | 9/1968 | Martz | ........................... | 219/411 |
| 3,470,046 A * | 9/1969 | Verdin | ........................ | 156/86 |
| 3,475,592 A * | 10/1969 | Berkl | ........................... | 219/388 |
| 3,515,853 A * | 6/1970 | McAdams | ................... | 392/409 |
| 3,776,803 A * | 12/1973 | Kissell | ........................ | 156/499 |
| 4,325,762 A * | 4/1982 | Burmeister et al. | ........... | 156/86 |
| 4,400,763 A | 8/1983 | Kribs et al. | | |
| 4,693,013 A * | 9/1987 | Pabst et al. | .................... | 34/266 |
| 4,749,843 A * | 6/1988 | Abramson | .................. | 219/411 |
| 4,803,364 A * | 2/1989 | Ritter | ..................... | 250/455.11 |
| 4,913,859 A * | 4/1990 | Overton et al. | ............ | 264/1.27 |
| 5,017,760 A | 5/1991 | Miller | | |
| 5,142,795 A * | 9/1992 | Abbott | ........................ | 34/444 |
| 5,241,157 A * | 8/1993 | Wermelinger et al. | ...... | 219/243 |
| 5,329,094 A * | 7/1994 | Murphy et al. | ............. | 219/243 |
| 5,384,889 A * | 1/1995 | Cook | .......................... | 392/416 |
| 5,511,145 A | 4/1996 | Bailey et al. | | |
| 5,853,289 A | 12/1998 | Todd et al. | | |
| 5,922,227 A | 7/1999 | McMurtrie | | |
| 5,964,522 A | 10/1999 | Schaefer et al. | | |
| D426,670 S | 6/2000 | Leen | | |
| 6,596,122 B1 * | 7/2003 | Savitski et al. | .......... | 156/304.2 |
| 6,683,281 B1 * | 1/2004 | Sundberg et al. | ........... | 219/405 |

FOREIGN PATENT DOCUMENTS

| | | | | |
|---|---|---|---|---|
| EP | 52230 | * | 5/1982 | ................. 219/535 |
| IT | 465960 | * | 11/1952 | ................. 392/417 |
| JP | 59-215820 | * | 12/1984 | ................. 392/416 |

* cited by examiner

Primary Examiner—Thor S. Campbell

(57) ABSTRACT

A pipe heating assembly includes a housing that has a pair of openings extending therethrough. The openings are axially aligned. A light emitter is hingedly attached to the housing and is selectively positioned in a first position facing inward of the housing or in a second position facing outwardly of the housing. A pipe may be positioned in the housing and heated by the light emitter.

15 Claims, 4 Drawing Sheets

PIPE HEATING ASSEMBLY WITH HINGEDLY ATTACHED LIGHT EMITTERS

BACKGROUND OF THE INVENTION

1. Field of the Invention

The present invention relates to pipe heating devices and more particularly pertains to a new pipe heating device for heating a PVC pipe so that the pipe may be selectively bent as needed for electrical purposes.

2. Description of the Prior Art

The use of heating devices is known in the prior art. U.S. Pat. No. 5,511,145 describes a heat lamp device adapted for using infrared light to heat air. A pipe heating device is shown in U.S. Pat. No. 5,017,760 and includes a housing having a heating coil therein. When a plastic pipe is extended through the housing, the heating coil is wrapped around the pipe for adequately heating the pipe.

While these devices fulfill their respective, particular objectives and requirements, the need remains for a device that is used for heating pipes comprised of a plastic material in such a manner that they become pliable enough to bend into a required shape. Additionally, it is preferred that the device may be used as an auxiliary lighting assembly for illuminating a job site. This will allow a worker to bring only one tool or device to satisfy two job related needs.

SUMMARY OF THE INVENTION

The present invention meets the needs presented above by comprising a housing that has a pair of openings extending therethrough. The openings are axially aligned. At least one light emitter is hingedly attached to the housing and is selectively positioned in a first position facing inward of the housing or in a second position facing outwardly of the housing. A pipe may be positioned in the housing and heated by the at least one light emitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
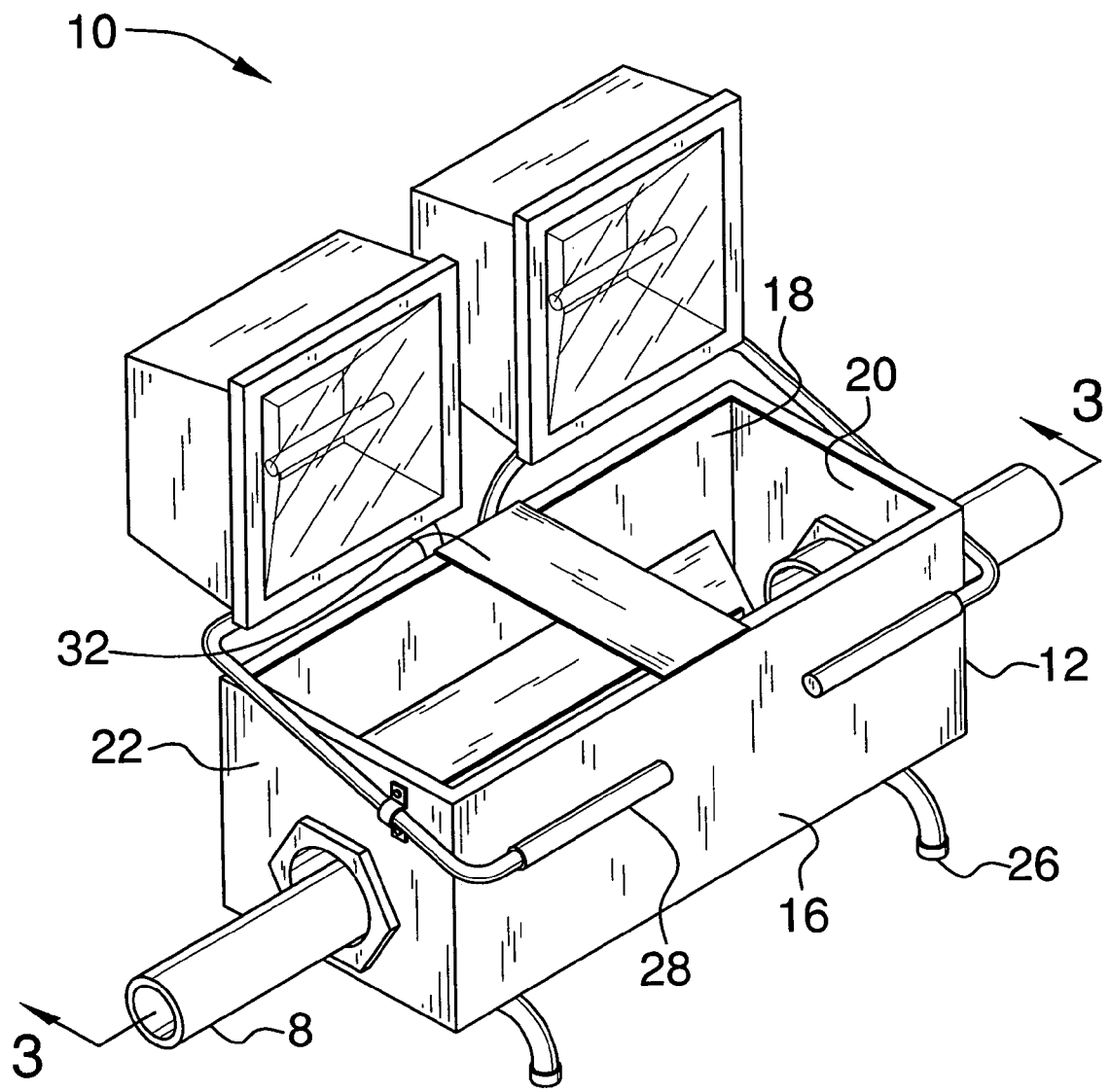
FIG. 1 is a front perspective view of a pipe heating assembly with hingedly attached light emitters according to the present invention.
Figure 2:
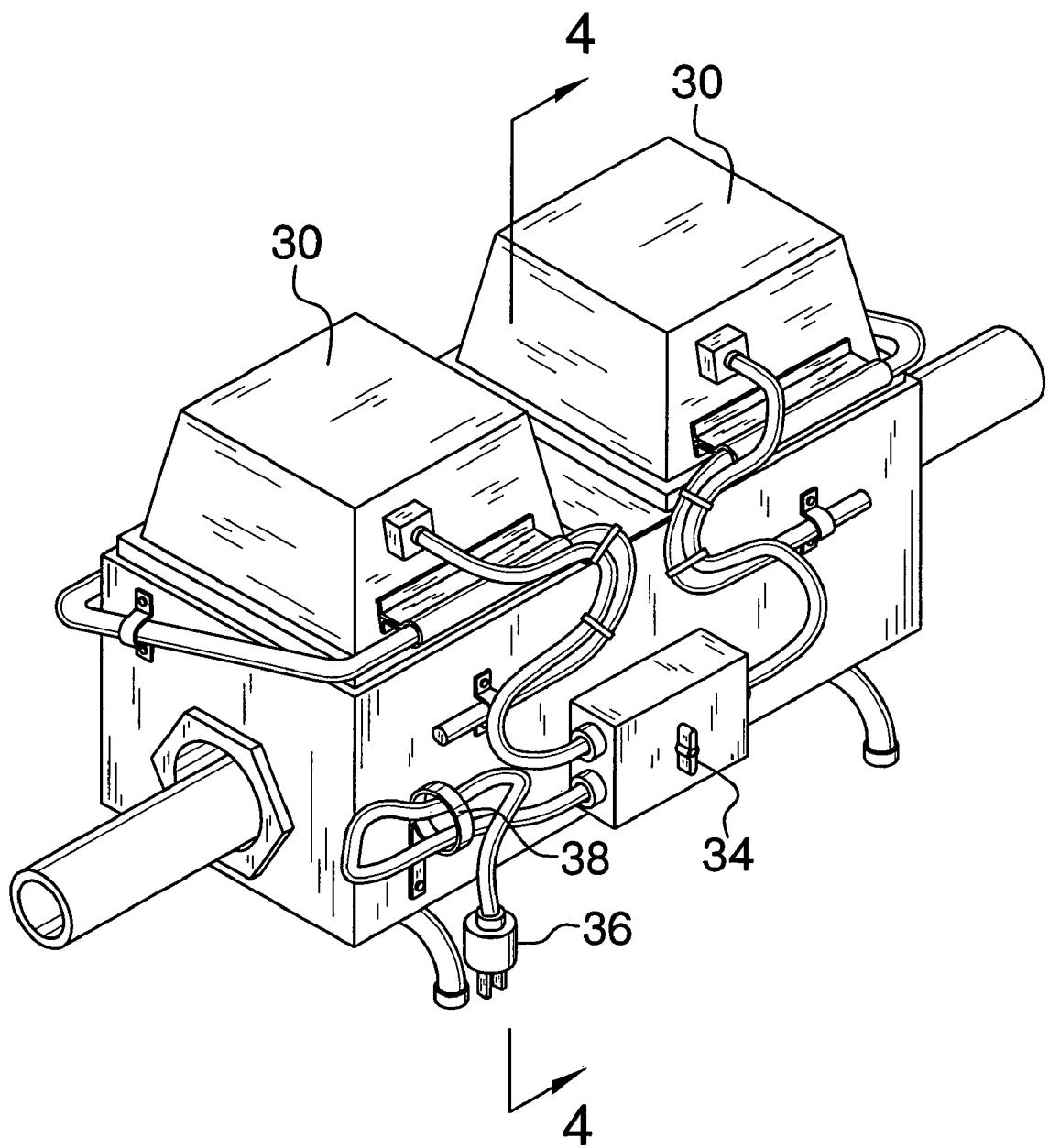
FIG. 2 is a rear perspective view of the present invention.
Figure 3:
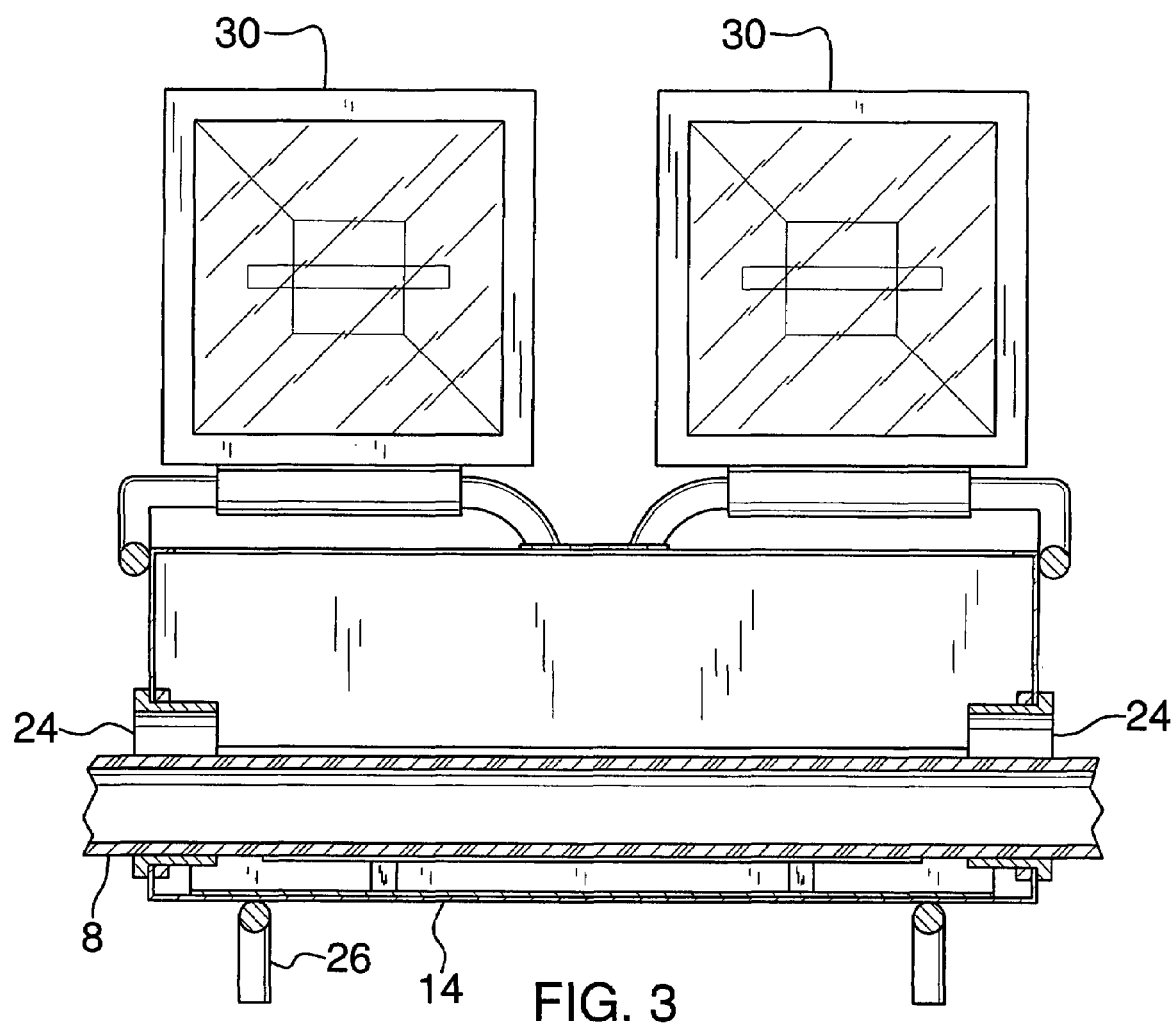
FIG. 3 is a cross-sectional view taken along line 3—3 of FIG. 1 of the present invention.
Figure 4:
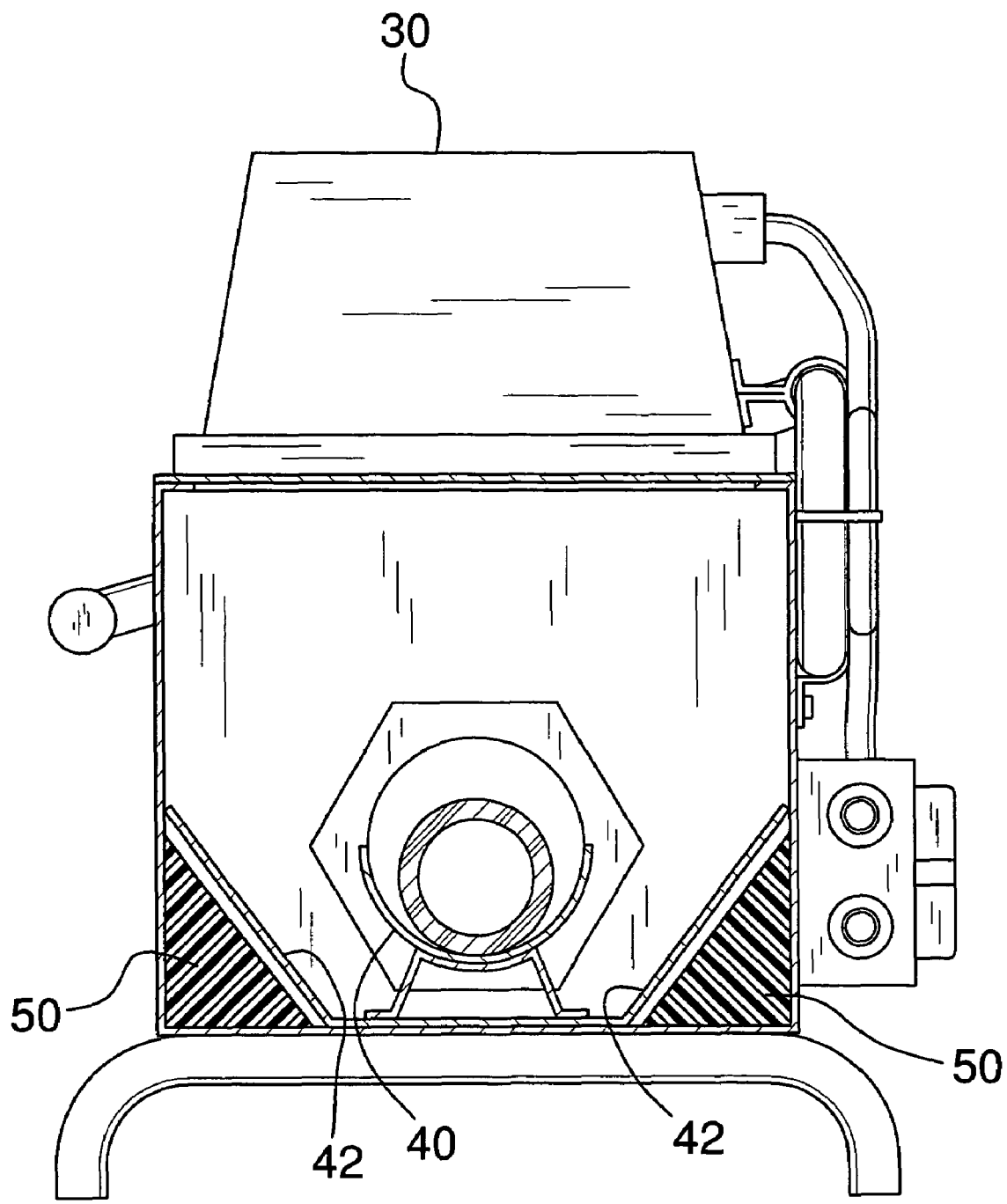
FIG. 4 is a cross-sectional view taken along line 4—4 of FIG. 2 of the present invention.

With reference now to the drawings, and in particular to FIGS. 1 through 4 thereof, a new pipe heating device embodying the principles and concepts of the present invention and generally designated by the reference numeral 10 will be described.

As best illustrated in FIGS. 1 through 4, the pipe heating assembly 10 with hingedly attached light emitters generally comprises a housing 12 that has a bottom wall 14, a front wall 16, a back wall 18, a first side wall 20 and a second side wall 22. Each of the first 20 and second 22 side walls has an opening 24 extending therethrough. The openings 24 are axially aligned with respect to each other. A plurality of legs 26 is attached to and extends downwardly from the housing 12. At least one handle 28 is attached to the housing 12. The openings 24 are positioned generally adjacent to the bottom wall 14 and each of the openings 24 has a diameter generally between two inches and five inches. The housing 12 generally has a width from the first side wall 20 to the second side wall 22 generally equal to 18 inches, a height generally equal to 12 inches and a width generally equal to 8 inches. It should be understood that while these measurements are preferred, the housing 12 and the openings 24 may have a different size to accommodate alternately sized pipes which are extendable through the openings 24.

At least one light emitter 30, and preferably a pair of light emitters 30, is hingedly attached to the housing 12. The light emitters 30 are selectively positioned in a first position facing inward of the housing 12 or in a second position facing outwardly of the housing 12. The light emitters 30 substantially cover the housing 12 when the light emitters 30 are in the first position. A plate 32 may be extended across the top of the housing 12 and between the light emitters 30. The plate 32 allows the light emitters 30 to be spaced from each other while still ensuring that the housing 30 is completely covered. The plate 32 also allows the width of the housing 30 to be increased without increasing the size of the light emitters 30. Each of light emitters 30 is preferably a 500 W halogen lamp. A pipe 8, comprised of plastic such as polyvinyl chloride, may be positioned in the housing 12 and heated by the light emitters 30. Once heated by the light emitters 30, the pipe 8 may be selectively bent as needed.

An actuator 34 for selectively turning the light emitters 30 on or off is electrically coupled to the light emitters 30. A power supply 36 is electrically coupled to the actuator 34. The power supply 36 may be a conventional power cord. A loop 38 is preferably attached to the housing 12 for securing the power cord to the housing 12 when not in use.

An elongated saddle 40 is positioned in the housing and is attached to the bottom wall 14. The saddle 40 is adapted for supporting the pipe 8 when the pipe 8 is extended through the openings 24. A plurality of reflective plates 42 is mounted in the housing 12. The reflective plates 42 are positioned adjacent to the bottom wall 14 and are angled so that light from the light emitters 30 is directed toward the saddle 40 and pipe 8. This ensures that the pipe 8 is heated quickly and as hot as possible with the light emitters 30. When not being used to heat a pipe 8, the light emitters 30 may be positioned in the second position and used to illuminate a job site. The walls of the housing 12 are preferably insulated to ensure that heat from the light emitters 30 is retained in the housing and that the housing does not become overly hot to the touch. Insulating the walls themselves or positioning insulating material 50 between the reflective plates 40 and the housing 30 may accomplish this.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pipe heating assembly comprising:
   a housing having a pair of openings extending therethrough, said openings being axially aligned, each of said openings having a width configured to accommodate a pipe therethrough; and
   at least one light emitter being hingedly attached to said housing adjacent to an upper wall of said housing and being selectively positioned in a first position facing inward of said housing toward a bottom wall of said housing or in a second position facing outwardly of said housing, wherein a pipe may be positioned in said housing and heated by said at least one light emitter, said at least one light emitter substantially covering said housing when said at least one light emitter is in said first position;
   at least one reflective plate being mounted in said housing, said at least one reflective plate being positioned adjacent to a bottom wall of said housing and being angled such that light from said at least one light emitter is directed upwardly toward the pipe when the pipe is positioned in said housing.

2. The assembly according to claim 1, wherein said housing includes a front wall, a back wall, a first side wall and a second side wall, each of said first and second side walls having one of said openings therein.

3. The assembly according to claim 1, further including a plurality of legs being attached to and extending downwardly from said housing.

4. The assembly according to claim 1, further including at least one handle being attached to said housing.

5. The assembly according to claim 1, wherein each of said openings has a diameter generally between two inches and five inches.

6. The assembly according to claim 5, wherein said openings are positioned generally adjacent to said bottom wall of said housing.

7. The assembly according to claim 6, wherein each of said at least one light emitter comprises a halogen lamp.

8. The assembly according to claim 1, wherein each of said at least one light emitter comprises a halogen lamp.

9. The assembly according to claim 1, further including an elongated saddle being mounted within an interior of said housing, said saddle being adapted for supporting the pipe when the pipe is extended through said openings, said at least one reflective plate being directed toward a bottom surface of said saddle.

10. The assembly according to claim 1, further including an insulating material positioned between said housing and said at least one reflective plate.

11. A pipe heating assembly comprising:
    a housing having a bottom wall, a front wall, a back wall, a first side wall and a second side wall, each of said first and second side walls having an opening extending therethrough, said openings being axially aligned, a plurality of legs being attached to and extending downwardly from said housing, at least one handle being attached to said housing, said openings being positioned generally adjacent to said bottom wall, each of said openings having a diameter generally between two inches and five inches;
    a pair of light emitters being hingedly attached to said housing and being selectively positioned in a first position facing inward of said housing or in a second position extending upwardly said housing, said light emitters substantially covering said housing when said light emitters are in said first position, wherein a pipe comprised of polyvinyl chloride may be positioned in said housing and heated by said light emitters;
    an actuator for selectively turning said light emitters on or off being electrically coupled to said light emitters;
    a power supply being electrically coupled to said actuator;
    an elongated saddle being positioned in said housing and being attached to said bottom wall, said saddle being adapted for supporting the pipe when the pipe is extended through said openings; and
    a plurality of reflective plates being mounted in said housing, said reflective plates being positioned adjacent to said bottom wall and being angled such that light from said light emitters is directed toward said saddle.

12. A pipe heating assembly comprising:
    a housing having a pair of openings extending therethrough, said openings being axially aligned;
    at least one light emitter being hingedly attached to said housing and being selectively positioned in a first position facing inward of said housing toward a bottom wall of said housing or in a second position facing outwardly of said housing, said at least one light emitter substantially covering said housing when said at least one light emitter is in said first position; and
    a pipe extended through at least one of said openings and being positioned in said housing, said pipe being heated by said at least one light emitter.

13. The assembly according to claim 12, further including an elongated saddle being mounted within an interior of said housing, said saddle being adapted for supporting the pipe when the pipe is extended through said openings.

14. The assembly according to claim 13, further including at least one reflective plate being mounted on said bottom wall and directing light from said at least one light emitter toward a bottom surface of said saddle.

15. The assembly according to claim 12, further including at least one reflective plate being mounted on said bottom wall and directing light from said at least one light emitter toward said pipe.

* * * * *